(12) United States Patent
Simonette et al.

(10) Patent No.: US 10,753,650 B2
(45) Date of Patent: Aug. 25, 2020

(54) DEVICE AND METHOD FOR AUTOMATICALLY DRY CLEANING REFLECTIVE PANELS

(71) Applicant: Dynamis Solutions, Inc., Las Vegas, NV (US)

(72) Inventors: Dallas Simonette, Las Vegas, NV (US); Houston Simonette, Las Vegas, NV (US)

(73) Assignee: Dynamis Solutions, Inc., Las Vegas, NV (US)

( * ) Notice: Subject to any disclaimer, the term of this patent is extended or adjusted under 35 U.S.C. 154(b) by 173 days.

(21) Appl. No.: 15/920,776

(22) Filed: Mar. 14, 2018

(65) Prior Publication Data

US 2019/0353406 A1 Nov. 21, 2019

Related U.S. Application Data

(60) Provisional application No. 62/471,055, filed on Mar. 14, 2017.

(51) Int. Cl.
*B08B 1/00* (2006.01)
*F24S 40/20* (2018.01)
*A46B 13/02* (2006.01)

(52) U.S. Cl.
CPC ............. *F24S 40/20* (2018.05); *A46B 13/02* (2013.01); *B08B 1/002* (2013.01); *B08B 1/005* (2013.01); *B08B 1/008* (2013.01)

(58) Field of Classification Search
CPC ......... A47L 11/38; B08B 1/005; B08B 1/007; B08B 1/002; B08B 1/008; A46B 13/02; G02B 27/0006; F24S 40/20
See application file for complete search history.

(56) References Cited

U.S. PATENT DOCUMENTS

| | | | |
|---|---|---|---|
| 2013/0206167 A1* | 8/2013 | Mor | B08B 1/008 134/6 |
| 2013/0305474 A1 | 11/2013 | Meller et al. | |
| 2013/0306106 A1 | 11/2013 | Meller et al. | |
| 2014/0007904 A1 | 1/2014 | Shapira et al. | |
| 2015/0184894 A1 | 7/2015 | Verma | |
| 2015/0306636 A1* | 10/2015 | Nagura | B08B 1/008 15/246 |

FOREIGN PATENT DOCUMENTS

| | | | | |
|---|---|---|---|---|
| CN | 204928723 U | * | 12/2015 | ............. F24S 40/20 |
| CN | 204928723 U | | 12/2015 | |

OTHER PUBLICATIONS

International Search Report dated May 25, 2018 in parallel PCT Application No. PCT/US18/22395.

* cited by examiner

*Primary Examiner* — Shay Karls
(74) *Attorney, Agent, or Firm* — Dicke, Billig & Czaja, PLLC

(57) ABSTRACT

A parasitic cleaning system for cleaning the reflective surfaces of a heliostat is disclosed. The system includes a blade carriage assembly that cleans the surface by imparting a frictional force as the carriage assembly moves across the surface to be cleaned. A cleaner drive system controls the motion of the blade carriage assembly over the surface. A guide system connects the cleaner drive system to the blade carriage assembly. The cleaner drive system applies a spring force to move the blade carriage assembly upwardly. The same spring system controls the lowering of the blade assembly over the surface to be cleaned.

16 Claims, 10 Drawing Sheets

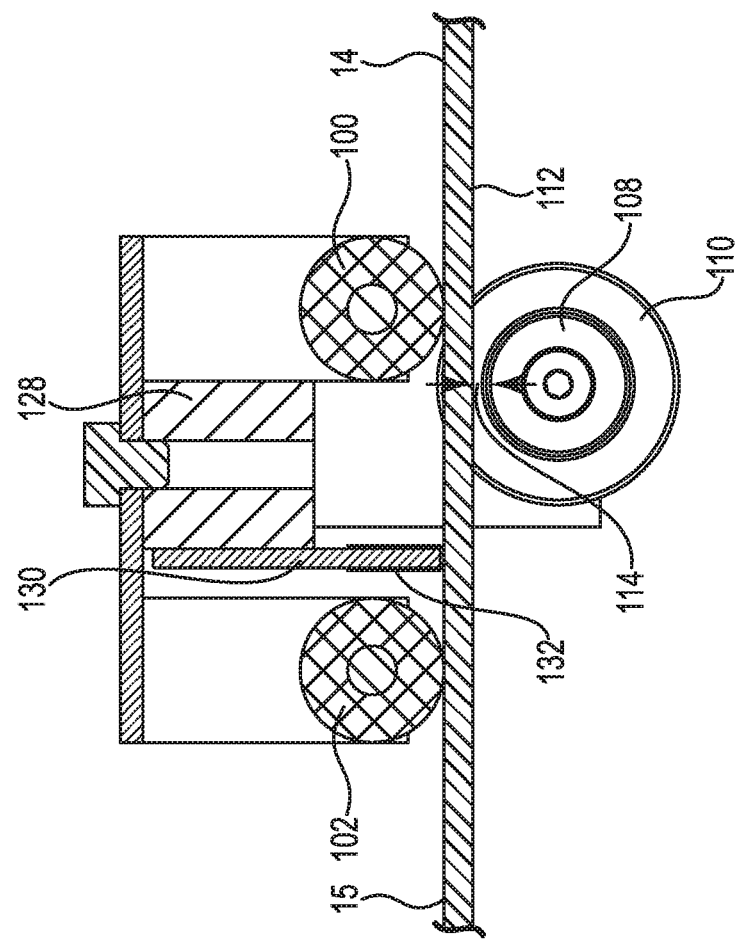

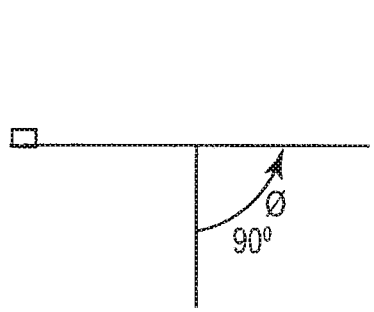
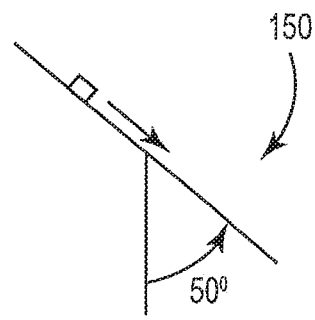
Fig. 9a  Fig. 9b
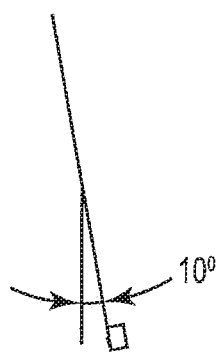
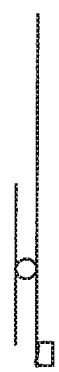
Fig. 9c  Fig. 9d
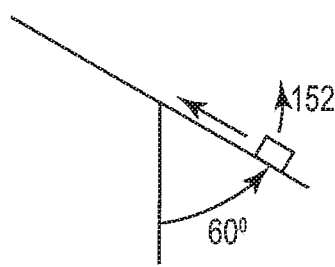
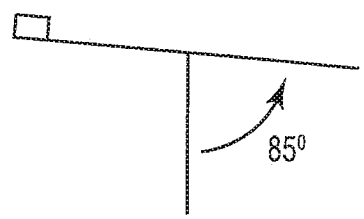
Fig. 9e  Fig. 9f

DEVICE AND METHOD FOR AUTOMATICALLY DRY CLEANING REFLECTIVE PANELS

CROSS-REFERENCE TO RELATED APPLICATIONS

This Utility patent application is a non-provisional application of U.S. Ser. No. 62/471,055, filed Mar. 14, 2017, which is incorporated herein by reference.

BACKGROUND

The present invention relates to surface cleaning systems, particularly cleaning systems suited for cleaning reflective glass panels that are components of heliostats used in concentrated solar energy plants.

The efficiency of concentrated solar field power production depends in part on the ability of the reflective glass panels to reflect and concentrate radiation from the sun onto a heat exchanger positioned on a tower. One factor that can prevent efficient energy generation is low reflectivity caused by dirt, dust, mud and other debris on the reflective panels.

The structures that support and rotate reflective glass panels about two axes of rotation are referred to as heliostats. A typical heliostat structure includes a vertical tubular support for supporting a glass panel support structure. The vertical support has a central vertical axis extending through the center of the tube from end to end and a first drive mechanism that causes the glass panel support structure to rotate about the vertical axis. The heliostat also includes a glass panel support structure with a horizontal rotational axis and a second drive mechanism that causes the glass panel support structure to rotate about the horizontal axis. By providing two axes of rotation, the position of the reflective surface of the heliostat can be altered. The glass panel support structure can rotate about its horizontal and vertical rotational axes at the same time, or at different points in time.

During power plant operation, the power plant control system causes the glass panel support structure to rotate about one or both axes which creates the ability to direct and maintain the reflected sunlight to a specific area on the collector atop of the tower. The control system is capable of moving the glass panels into a substantially vertical resting position when the plant is not in operation, and into a substantially horizontal position during high winds and other conditions. During operation of the power plant, the glass panels may be stationary during periods of time, may move continually or may move intermittently Reflective surface cleaning systems have been developed that require their own control systems, motorized mechanisms, and in some cases, water and chemicals to clean the reflective surfaces. For example, U.S. Patent Publication 20130306106 describes a motorized dry cleaning system for cleaning rows of photovoltaic solar panels. The cleaning system has a motorized carriage that moves from an upper to a lower edge of a solar panel whose surface is positioned at an angle with respect to the horizontal. The carriage also moves horizontally from panel to panel.

Known cleaning systems require the use of motorized components, independent control systems and power sources to enable the systems to operate. Such systems are costly to build, require a power supply, and the operation of the systems must be integrated into the control system of the concentrated solar power plant. The cleaning cycles must also be coordinated to avoid interfering with power plant operation. It would be desirable to provide a mechanized parasitic system that cleans reflective panels during the normal operation of a solar field, does not require water, chemicals, a power source for operation or an independent cleaning control system to operate and be a fail-safe. In other words, a cleaning system failure would not cause heliostat damage or hinder heliostat operation. It would also be desirable to provide a system that cleans by taking advantage of the normal movements of the heliostat during operation such that no additional manipulation or movement of the heliostat is needed to accomplish cleaning.

For these and other reasons, a need exists for the present invention.

SUMMARY

Embodiments of the present invention include a device for dry cleaning a substantially flat reflective surface of a reflective panel, such as a glass panel or multiple co-planar panels of a heliostat of the type used in concentrated solar plants. An exemplary panel is made of plate glass with a reflective backing. The glass may be tempered glass and is typically between ⅛ and ¼ inch thick. Typically, four (or more) panels are installed on each heliostat and the reflective surfaces are all substantially co-planar. The glass panel has a first edge, a second opposite edge, a first side edge and a second opposite side edge. The glass panel or panels may be supported by a moveable support frame that provides rigidity to the panel, and protects the panel from damage due to wind, rain, snow, debris and other forces that could damage the panel if the panel is struck or a force is applied to the surface. A typical moveable support frame includes a substantially horizontal support, which may be cylindrical in shape, having a horizontal pivotal axis offset from the central axis of the cylinder. An exemplary support frame also includes a series of elongated support members and struts that are positioned perpendicular to the horizontal support, the support members affixed to a face of the glass panel opposite the reflective surface.

A heliostat that is equipped with a cleaning system of an example of the present invention may also include a drive mechanism for causing the moveable support frame to rotate about the horizontal pivotal axis of the heliostat in first and opposite rotational directions, causing the entire flat reflective surface to pivot about the horizontal axis. The heliostat may rotate about the vertical axis during rotation about the horizontal axis, or the rotations may occur independently. Cleaning may be accomplished during rotation of the moveable support frame about the horizontal axis during normal plant operation.

An exemplary cleaning device of the present invention includes a blade carriage assembly, which is elongated, and includes an elongated blade support and a flexible blade affixed to the blade support. The blade in examples of the invention is at least partially covered with a synthetic material that has an abrasive surface and that when passed over bristles of a brush, self-cleans. The flexible blade extends from the first side edge to the second side edge of the reflective panel and is position-able on the reflective surface, such that the flexible blade contacts the reflective surface during cleaning.

The blade and blade support are part of a blade carriage assembly that rests at a first end when the reflective surface is either substantially horizontal or its first edge forms an angle with respect to the vertical axis of the heliostat support that between about 85 and about 90 degrees (substantially horizontal). Upon rotation of the reflective surface such that the first edge forms an angle with respect the vertical axis of about 50 degrees or less, the blade carriage assembly is under the force of gravity, and the blade overcomes the frictional forces and moves in a direction from the first edge to the second opposite edge. As the blade moves downwardly over the sloping surface, the blade scrapes off dirt, dust, mud and debris off the reflective surface. The blade carriage assembly continues to move until it reaches the second opposite edge of the reflective surface, and becomes docked at the second edge.

An example of a guide system is provided comprising at least one, and in an example two elongated flexible members such as a cable, each elongated flexible member fixedly attached at one end to the blade carriage assembly. The guide system is capable of controlling speed of movement of the blade assembly across the reflective surface. The elongated member is attached at the opposite end to a cleaner drive system, which in one embodiment comprises a torsion spring movement system.

The exemplary cleaner drive system controls the blade carriage assembly during movement from the first edge to the second opposite edge. When the glass panel rotates about the horizontal pivotal axis of the heliostat in a first axial direction, the cleaner drive system prevents the blade carriage assembly from accelerating and controls the linear speed of movement of the blade carriage assembly.

The exemplary cleaner drive system of cleaning systems of the present invention controls the speed of movement of the blade carriage assembly as the blade continues to move in a controlled manner until the blade reaches the second edge, where it comes to rest and becomes docked in a second location. When the reflective glass surface is in a substantially vertical position, the blade carriage assembly is docked in the second position, at the second opposite edge 18. Just before the blade carriage assembly comes to rest in the second docking position, it passes over a stationary elongated brush having bristles that face the lower edge of the blade, and that cleans the blade as the blade passes over the bristles just prior to docking in the second position, and prior to the blade carriage assembly's return to the first docking position at the first edge 16.

During operation of the heliostat, when an angular rotation of the support frame that supports the flat reflective surface about the horizontal axis is reversed, gravitational forces decrease as it moves towards a horizontal position. Then the stored energy in the torsional spring of the cleaner drive system applies a force to the blade carriage assembly that overcomes the decreasing weight of the blade carriage assembly and the drag caused by the blade's contact with the dirty surface, the blade carriage assembly begins to move upwardly across the reflective surface from the second edge, towards the first edge. Movement is controlled by the cleaner drive system, and the exemplary cleaner drive system returns the blade to the first edge by means of a spring force. The stored energy in the spring imparts enough force to overcome the decreasing weight of the blade carriage assembly due to the changing angle of gravitational force and the friction between the blade and the reflective surface, enabling controlled, uphill movement.

In embodiments, the drive system utilizes a spring that applies an angular force to a steel shaft that has at least one spool fixedly mounted onto an end of the shaft, forming an attachment point to the elongated member of the guide system. The spring force opposes the force of gravity to control the lowering of the blade when the angle between a vertical line and a line intersecting a side edge of the reflective surface is becoming smaller, and then stored energy in the spring causes the blade to retract to its original position when the angle becomes larger.

An exemplary method of dry cleaning a substantially flat reflective surface of a reflective panel is described. The method includes the step of providing a blade carriage assembly with a rigid blade support and a flexible blade mounted on or in the rigid blade support, such that a portion of the blade extends outside of or downwardly, beyond an edge of the rigid support structure. The blade carriage assembly may extend from one side to an opposite side of a reflective panel or panels. In some embodiments, the blade carriage assembly is equipped with a roller guide assembly at each end to retain the carriage assembly on the reflective panel regardless of panel orientation as the panel rotates about the horizontal rotational axis, and allows smooth linear movement of the blade over the length of the panel from first to the second opposite end. The blade carriage assembly is configured to be moveable from a first edge of the reflective panel to the second opposite edge, moving in a linear path. According to the exemplary method, the blade assembly may be positioned at the first edge of the reflective panel in a first docked position and at a second edge of the reflective panel in a second docked position. The blade carriage assembly in embodiments passes over a fixed brush assembly to self-clean the blade when the blade is near the second docking position. Each time the blade carriage assembly travels once across the reflective panel surface, it cleans the surface, regardless of the direction of travel of the blade. During normal daily operation of the power plant, each reflective surface is cleaned twice.

The exemplary method of dry cleaning a reflective surface includes providing a cleaner drive mechanism with a torsion spring affixed to a reflective panel support structure. The method may provide at least one guide system for controlling movement of the blade assembly over the surface of the reflective panel in a first direction from the first edge to the second edge, and then in a second direction from the second edge to the first edge.

According to the exemplary method, the reflective panel may be rotated about a horizontal axis in a first angular direction to cause the blade to leave a first docked position at the first edge and move in a controlled manner to the second edge into a second docked position. The panel then may be rotated about the horizontal axis in a second opposite angular direction; causing the blade to reverse a linear direction of travel and cause the blade to move from the second docked position back to the first docked position by means of a spring force.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 7 is a cross-sectional view along line B-B as shown in FIG. 8 of the carriage assembly.

FIG. 9a-FIG. 9f are schematic views of six operational positions of the reflective panels of a heliostat during two separate cleaning cycles of operation.

DETAILED DESCRIPTION

Figure 1:
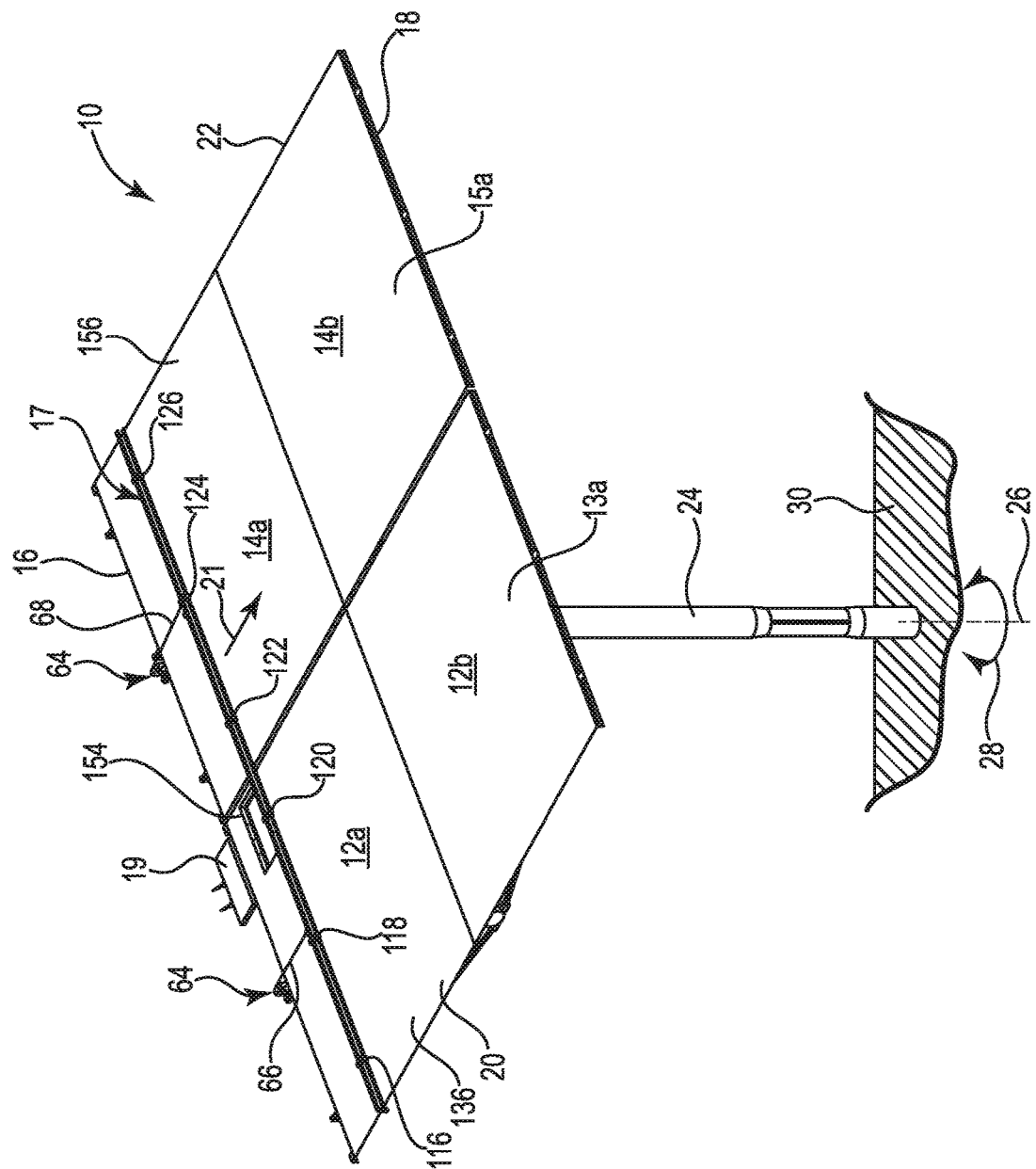
FIG. 1 is a perspective view of a heliostat having four co-planar reflective surfaces and an exemplary parasitic cleaning system of embodiments installed thereon.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is a parasitic dry cleaning system that is capable of cleaning the reflective surfaces of a heliostat in two stages or cleaning cycles during the normal daily operation of the heliostat. The system is considered parasitic because it does not require its own control system, nor does it require its own power source. During normal operation of a heliostat, the reflective surface is moved by the heliostat control system in various ways, which over the course of a day causes the surface to pivot about a horizontal axis a great enough angular distance to activate the cleaning system twice, completing two cleaning cycles. The system is considered parasitic in operation because it completes two cleaning cycles per day when the plant is in normal operation, and without imparting any extra or special movements on the heliostat.

The system is activated by movement of the reflective surfaces during normal operation of a concentrated solar plant system, and in some examples operates while the reflective surfaces are in motion. In other examples, as soon as the reflective surface moves far enough to overcome forces of gravity, friction and or a spring force, the system is activated, even if the support frame supporting the reflective panels ceases to rotate.

A heliostat may be positioned such that the reflective surfaces are substantially horizontal during a wind storm or when the sun is directly above the solar field. When the solar field is not operating, the reflective surfaces may be positioned substantially vertically, in order to minimize the collection of dust and dirt. During daylight hours, the control system of the heliostat continually repositions the reflective surfaces to maximize energy collection.

When the plant is put into operation at sunrise, the heliostats are moved from a resting position, and are rotated about a vertical and horizontal axes, and are moved into a position that permits the reflective surfaces to reflect and concentrate the suns energy towards a tower that includes a heat exchanger. The concentrated energy is focused on the external surfaces of the tubes. Within the tubes is a circulating liquid capable of absorbing the heat, such as molten salt or ethylene glycol, for example. This heated liquid is pumped to a steam plant, where the stored heat is used to generate steam, and the steam is then converted into electricity by known means.

Examples of devices of the present invention are capable of dry cleaning the reflective surfaces during time periods when the power plant control system is rotating the support frame of the reflective surfaces about a horizontal axis, which in embodiments is spaced apart and parallel to the plane, as well as an edge of a substantially rectangular reflective surface. Although one form of reflective surface is formed from mirrored glass, other reflective surfaces may be used, such as highly polished metals such as stainless steel, and metal coated plastic sheets, for example. Devices of the present invention are capable of dry cleaning a substantially flat reflective surface of a reflective panel whenever the power plant control system causes the reflective surface of the heliostat to rotate about the horizontal axis, such that the first edge of the panel or panel array is raised above the second opposite edge, and then again when the direction of rotation is reversed such that the first edge is lowered. In embodiments, the first edge is never lowered below an elevation of the second opposite edge.

Referring now to FIG. 1, a heliostat 10 is shown with four reflective panels 12a, 12b, 14a, 14b, each having reflective surfaces 13a, 13b, 15a, 15b that are substantially coplanar. These reflective surfaces 13a, 13b, 15a, 15b may comprise multiple reflective glass mirrors such as an array of four as shown, and may also be formed of more or fewer panels (not shown). The array of four separate panels will be described herein as one panel, but it is to be understood that a typical heliostat includes four panels, as shown.

The reflective panel 12, 14 has a first edge 16, a second opposite edge 18, a first side edge 20 and a second opposite side edge 22. The first edge 16 may be positioned at the same elevation as the second edge 18 (i.e.—when the panel 12, 14 is substantially horizontal) and may be positioned above the elevation above the second opposite edge (when the glass panel is substantially vertical). The heliostat 10 may have a vertical support 24 that is tubular. The panel 12, 14 may be supported by a moveable support frame that pivots in two axial directions about a central vertical axis 26 as shown by arrow 28. The vertical support 24 may be positioned in the ground 30 and secured by tightly packing soil around its outer surface, or by other means such as concrete, or a stone foundation.

The heliostat 10 is shown equipped with an exemplary cleaning system of the present invention, which includes a blade carriage assembly 17 in motion, traveling in a direction shown by arrow 21 after the assembly has left the first edge 16 but before the assembly has arrived at the second edge 18. The heliostat 10 may also be equipped with a photo voltaic panel 19 to supply a source of energy to the control system (not shown).

Figure 2:
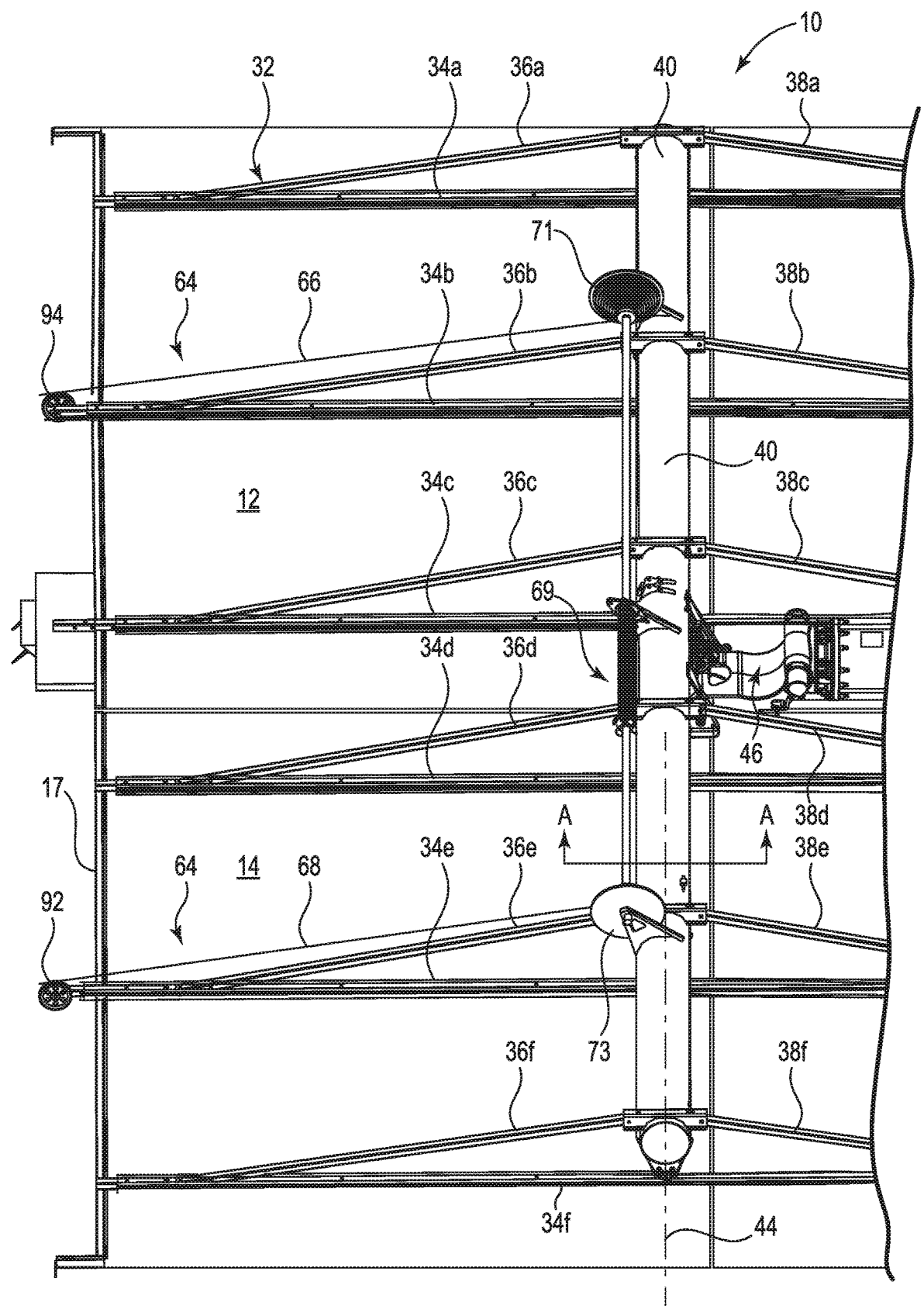
FIG. 2 is a bottom perspective view of a reflective glass panel of a heliostat, illustrating an example of a cleaning system of the present invention.
Figure 3:
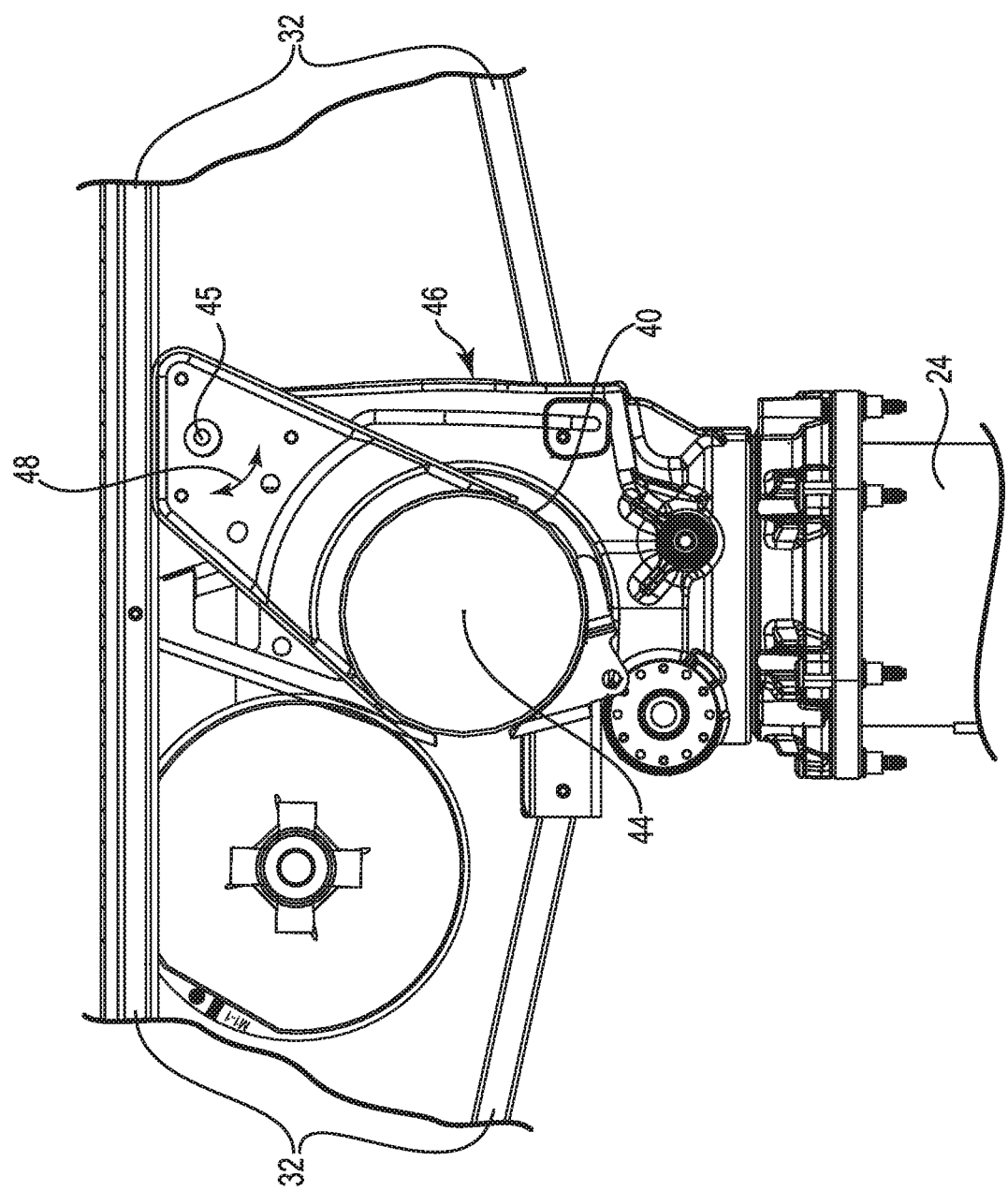
FIG. 3 is a cross-sectional expanded view of a heliostat drive mechanism, showing the location of the horizontal axis of rotation.

The reflective panels 12, 14 are mounted to a moveable support frame 32, as shown in greater detail in perspective from below in FIG. 2. The support frame 32 includes a plurality of elongated support members 34a, 34b, 34c, 34d, 34e and 34f, each support member contacting and secured to the non-reflective opposite surface of the reflective panels 12, 14 and positioned at spaced intervals. The method of securing the surface to the elongated support members can include an adhesive tape, such as a double sided adhesive tape with a cushioning elastomeric layer supporting the adhesive. Other methods of securing the support members to the panels include suction cups, or other securing means such as mechanical fasteners at each end of or fasteners such as bolts extending through the thickness of the reflective panel at spaced intervals. In the illustrated embodiment, the support members 34a-34f are positioned in parallel relationship to each other, and are positioned such that the long sides are aligned with a direction of travel of the blade carriage assembly 17. The support structure 32 also includes a plurality of struts 36a-f and 38a-f, each strut fixedly connected at one end to a location of the support member 34a-34f spaced apart from the first end and at the opposite end to a substantially horizontal support 40. In the illustrated embodiment, the horizontal support 40 is cylindrical and has a central axis 44 that is parallel to and spaced apart from central pivotal axis 45 of the support frame 32. A cross-sectional view of the support frame 32 along line A-A as shown in FIG. 2 is shown in greater detail in FIG. 3. The heliostat drive mechanism 46 is adapted to cause the support frame 32 to rotate about pivotal axis 45 (normal to the paper) in first and opposite rotational directions illustrated by arrow 48, which in turn causes the entire reflective glass panel 12, 14 to rotate about horizontal axis 45.

Figure 4:
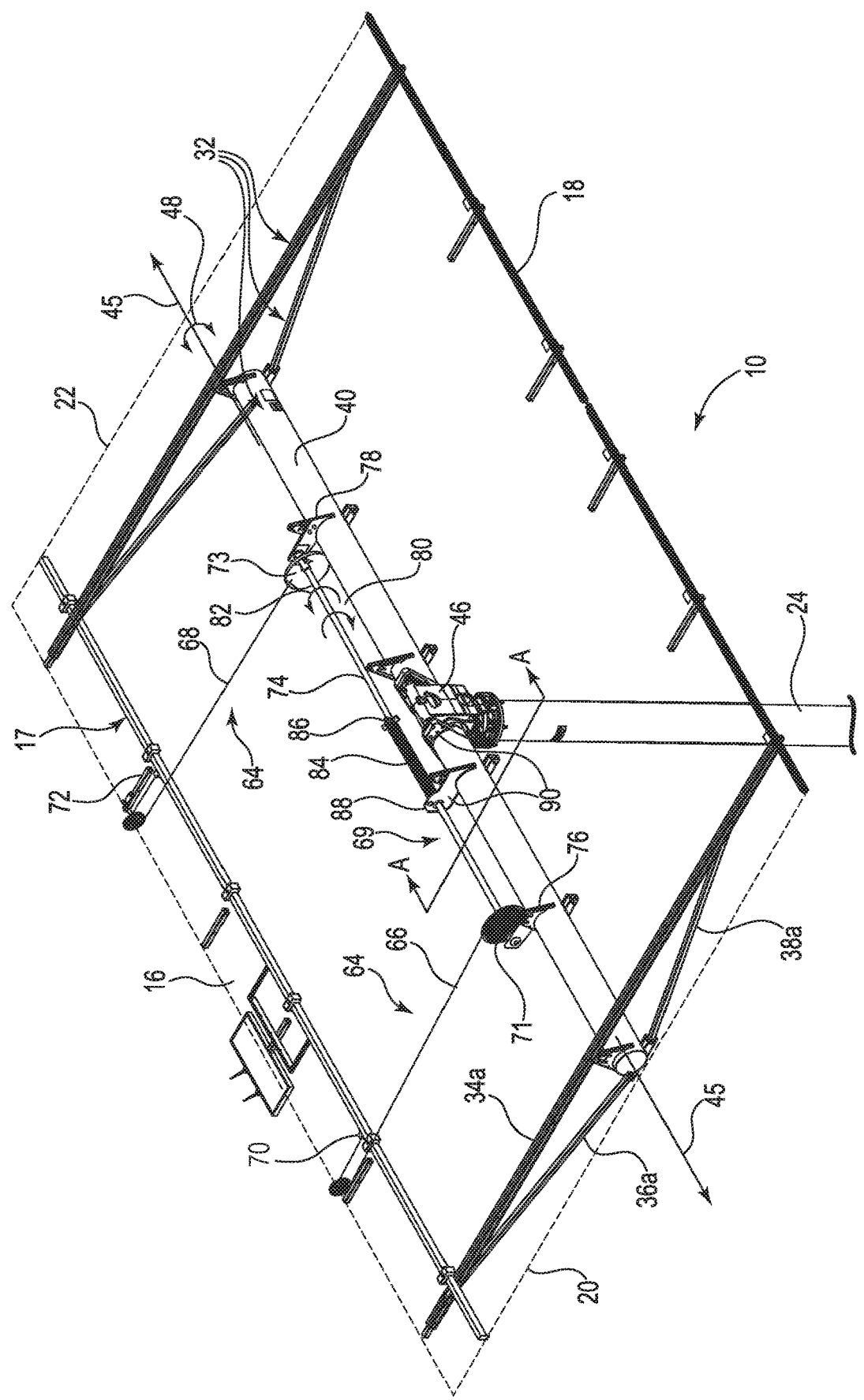
FIG. 4 is a perspective view of a heliostat support frame with an installed cleaning system of an example of the invention, with the reflective glass panels removed for illustration purposes.

FIG. 4 is a perspective view of a heliostat with the reflective panels 12, 14 removed, for illustration purposes. The interior elongated support members 34b, 34c, 34d and 34e, and struts 36b, 36c, 36d, 36e and 38b, 38c, 38d, and 38e are also removed to more clearly illustrate the features of an exemplary cleaning system of the present invention.

In this example of the invention, the blade carriage assembly 17 extends from a first side edge 20 (shown in phantom) of panel 12 to a second opposite side edge 22 (shown in phantom) of panel 12, 14. The blade carriage assembly 17 is positionable on the reflective surface 13, 15. The blade carriage assembly 17 is capable of scraping and/or wiping dust, dirt and other debris off of the reflective surface 13, 15 as the blade carriage assembly 17 moves across the surface. In embodiments, the blade carriage assembly 17 remains substantially horizontal as the blade moves laterally across the reflective surface. The details of construction of the blade carriage assembly 17 are described more fully below.

Figure 6:
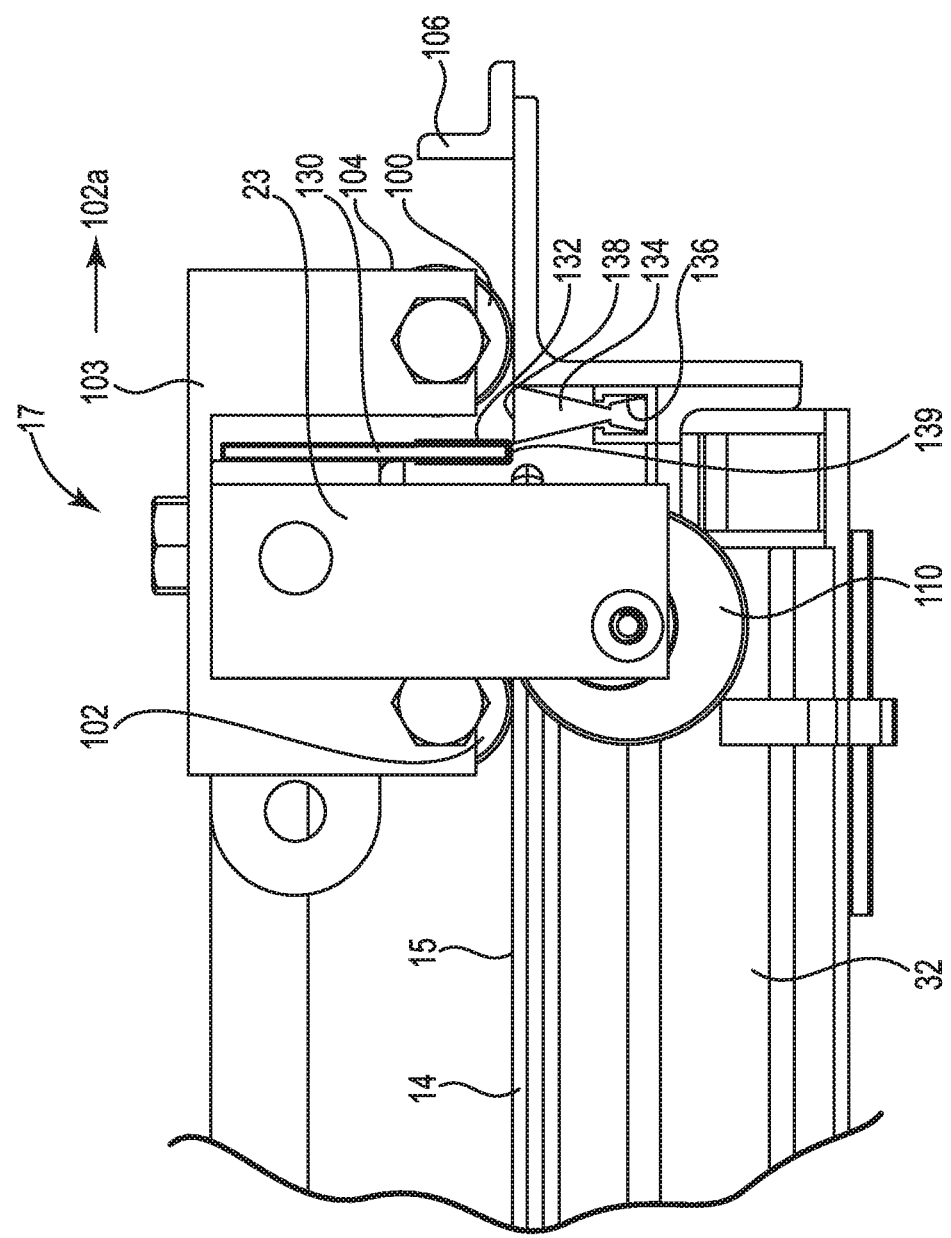
FIG. 6 is an enlarged side elevational view of the blade carriage assembly, as the assembly is reaching the second docking position.

The blade itself may be formed of a pliable material such as neoprene rubber, silicone or other polymeric material that is rigid enough to apply a sufficient force to clean the reflective surface, but is pliable enough to make full contact all portions of the reflective surface, even when that surface is slightly curved or dished. The blade must deform enough to compensate for variations in flatness and any curvature of the reflective surface. The blade in one example of the invention is formed of EPDM rubber having a stiffness of between about 60 and about 80 shore A durometers. The blade is between about 1.5 and about 4.8 millimeters thick and extends between about 19 and about 32 millimeters below the lowest point of an elongated support 128 which may be formed of square stock or other rigid material. The blade may be secured to a side of the square stock with an adhesive such as double backed adhesive tape, or may be press fitted into a groove cut into the square stock (not shown). The blade can be secured to the elongated support 128 by means of fasteners such as bolts, pins or screws. A retaining plate (not shown) may be used to apply an even pressure to the blade 130 (FIG. 6).

In embodiments, the blade is partially covered with a textured fabric material such as synthetic suede to impart a more abrasive action to the blade. The fabric is secured to the elastomeric blade using double sided pressure sensitive adhesive tape, contact adhesive or by sewing with thread. Additional details of the blade carriage assembly 17, are described further below.

The blade carriage assembly 17 as shown in FIGS. 1 and 4 is secured to a guide system 64, which includes at least one, and in the illustrated embodiment, two elongated flexible members 66, 68 which can be formed from metal wire rope, chain, fiber or polymer rope or a polymeric belt material. In the illustrated embodiment, the elongated members 66, 68 are formed of steel wire rope coated with a galvanic coating to protect the cable and prevent rust when exposed to environmental forces, such as dirt, dust, extreme temperatures and moisture. The flexible members 66, 68 are fixedly secured at one end at spaced apart locations 70, 72 to the blade carriage assembly 17. The flexible members 66, 68 are affixed to the blade carriage assembly 17 with cable anchors, U-bolts, or other known fasteners. The two elongated flexible members 66, 68 are secured at opposite ends to a cleaner drive system 69, best shown in FIG. 4.

The cleaner drive system 69 includes two helical spools 71, 73. Each spool 71, 73 is fixedly mounted to opposite ends of a rotational shaft 74 of the cleaner drive system. The rotational shaft is rotationally mounted proximate each end through a bearing (not shown) mounted in a flange 76, 78. The flanges 76, 78 are fixedly mounted to the horizontal support 40 of the heliostat 10. Each flange 76, 78 may be bolted or welded to the horizontal support. As the shaft 74 of the cleaner drive system 69 rotates, the spools 71, 73 rotate with the shaft 74. Because the spools are helical, the increasing force imparted by the spring as it winds tighter, is counteracted by the increase in moment arm length which results in a constant force load on the wire rope. When the shaft is rotating in a first direction shown by arrow 80, the cables 66, 68 shorten, causing the blade assembly 50 to move toward edge 16. When the shaft 74 rotates in the opposite direction as shown by arrow 82, the cables 66, 68 lengthen, allowing the blade assembly 50 to travel towards edge 18. The drive system 69 regulates the speed of travel as the guided blade carriage assembly 17 moves from the first edge 16 to the second opposite edge 18 during rotation of the support frame 32 about axis 45 in a first rotational direction by means of gravity, and to move the guided blade carriage assembly 17 from the second edge 18 back to the first edge 16 by means of stored energy in the torsional spring when the support frame 32 is moving in a second opposite rotational direction 48b. The drive system 69 includes a torsional spring 84 that is coiled and positioned over the exterior surface of the shaft 74. The spring 84 is anchored fixedly to the outside surface of the shaft 74 at a first end 86 with an annular ring that locks to the outside surface, and is secured to the horizontal support 40 at a second opposite end 88. A flange 90 is provided to anchor the opposite end 88 of the spring to the horizontal support 40 at a location spaced apart from the exterior surface of the tubular horizontal support 40. Helical spools 71, 73 have a helical receiving surface that cooperates with the elongated members 66, 68. The shape of the receiving surface for each helical spool is selected so that the pressure that is applied by the spring is fairly constant which controls the movement of the blade carriage assembly 17, preventing the blade carriage assembly 17 from accelerating during movement in either direction.

Referring back to FIG. 2, the guide system includes at least one pulley 92, 94 mounted for rotation about a central axis to the moveable support frame 32. The pulleys 92, 94 guide elongated flexible members 66, 68 past and around the edge 16 of the reflective panels 12, 14, changing a direction of linear force to an opposite direction. Each pulley 92, 94 may include a circumferential groove for receiving the elongated members, and retaining the elongated members within the groove during operation. In other embodiments, when the elongated members 66, 68 are chains or belts, the pulleys are replaced with sprockets or wheels with teeth. Referring back to FIG. 4, the blade carriage assembly 17 may come to rest and dock at the first edge 16 or at second opposite edge 18, depending on the orientation of the reflective surface 62 with respect to the vertical, which is described in more detail below.

Figure 5:
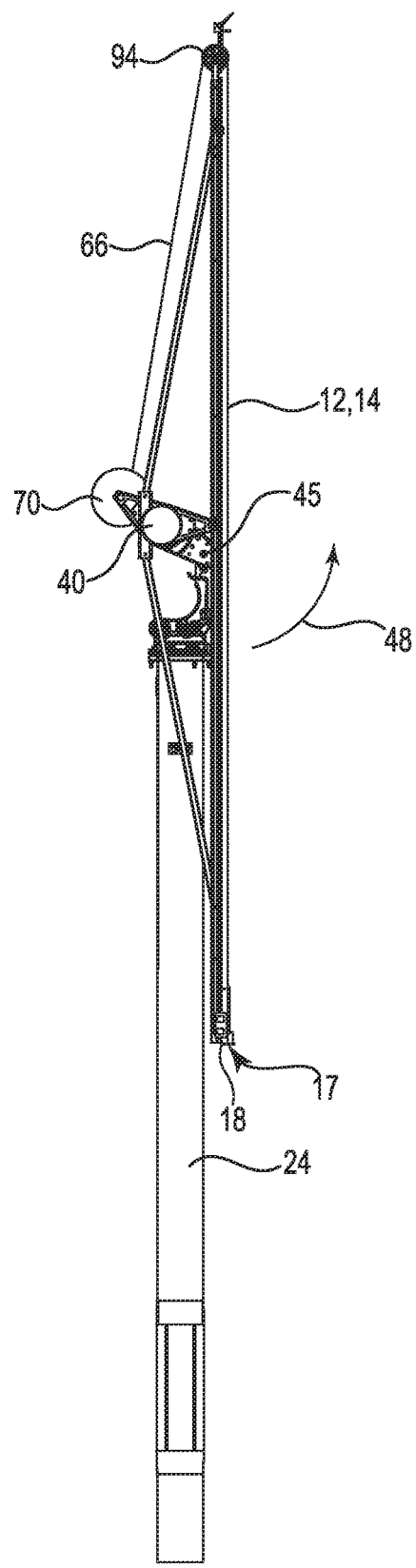
FIG. 5 is a side elevational view of a heliostat with an exemplary cleaning system installed, with the blade carriage assembly docked in the second position.

Referring now to FIG. 5, when the heliostat is shown in a resting position, with reflective panels 12, 14 nearly vertical, to minimize the dust and dirt accumulating on the surfaces. When the reflective panels 12, 14 are in this resting position, the cleaning blade carriage assembly 17 is docked at the second edge 18, at the lowermost position. When the blade carriage assembly 17 is in the second docked position, the tension on the spring 84 is at its maximum. As the moveable support frame 32 is rotated about rotational axis 45 (into the paper), in an angular direction indicated by arrow 48, the gravitational force on the blade 17 shifts during the transition which allows the force of the spring 84 to pull blade carriage assembly 17 upwards and linearly back over the reflective surface 13, 15 until reaching the first docking station at first edge 16.

Aspects of an exemplary blade carriage assembly are shown in FIG. 6. FIG. 6 is a detailed side elevational view of the blade carriage assembly 17, at one end. The blade carriage assembly 17 includes a rolling structure 23 for moveably securing the assembly 17 at each end to a side edge 22 of the reflective panel 14. A plurality of supported roller pairs 100, 102 are mounted for rotation within a bracket 103 of the blade carriage assembly contacts the top surface 15 of the reflective panel 14 during movement. When the carriage assembly 17 is moving towards the first end 16 in the direction shown by arrow 102*a*, the carriage assembly 17 continues to move across the reflective surface 15 until a leading edge 104 contacts stop 106, as shown in FIG. 6. The blade carriage assembly 17 in this example of the invention includes a lower roller 108 (FIG. 7) that includes a larger diameter outer rim 110. The outer rim 110 travels on the outside edge 22 of the reflective panel, preventing the blade carriage assembly 17 from moving laterally across the surface of the reflective panel 12, 14. The lower roller 108 remains spaced apart 114 from the lower non-reflective surface 112 of the reflective panel 14 unless the support frame 32 is pivoted such that the angle between the central vertical axis 26 of the heliostat's vertical support 24 and a line co-linear with the edge 22 of the reflective panel is zero or is slightly negative. In that case, the lower roller 108 retains the blade carriage assembly 17 securely on the reflective glass panel 14.

Figure 7A:
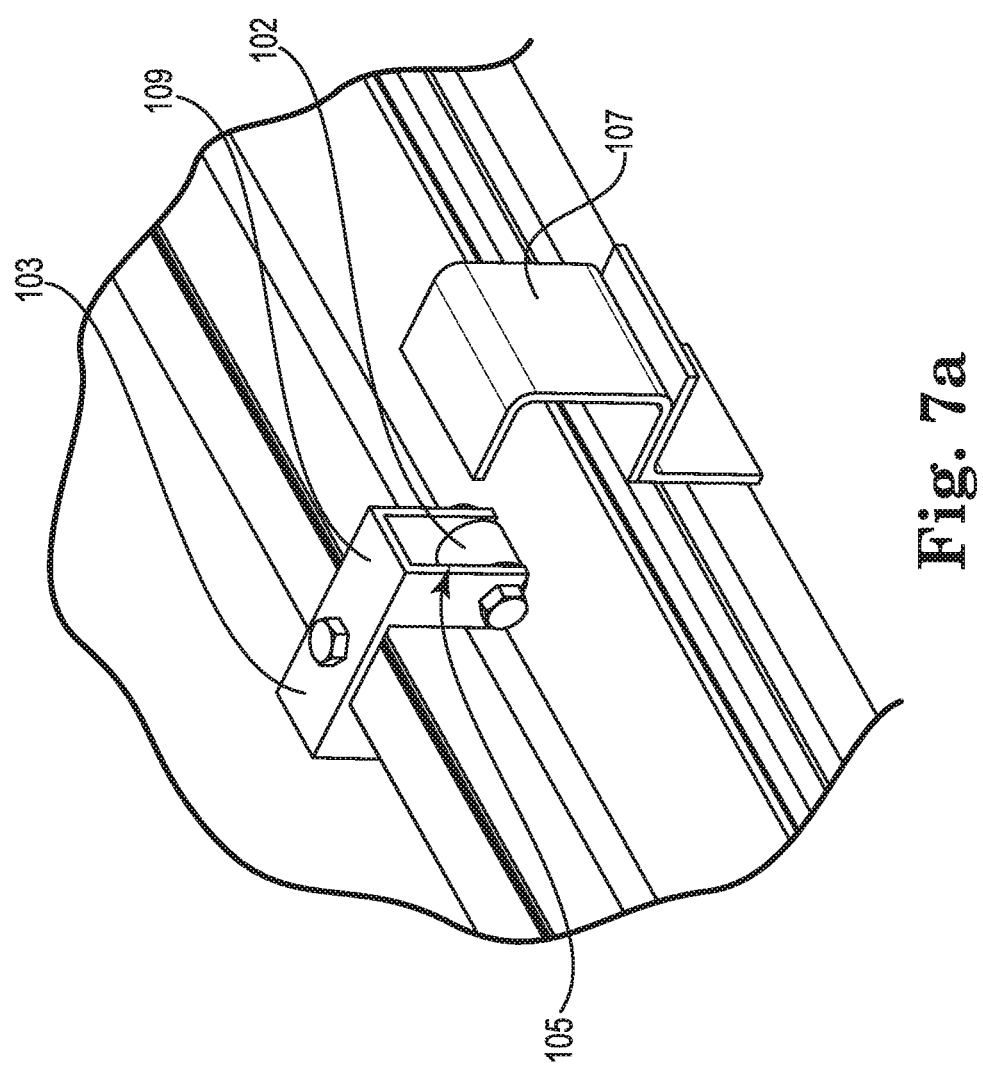
FIG. 7a is an expanded view illustrating one alternate embodiment of a docking station.

A detailed expanded view of an alternate second docking station is shown in FIG. 7*a*. In that figure, the roller pairs 100 (not shown), 102 and bracket 103 supporting roller pairs 100, 102 have a leading edge 105 that comes into contact with docking bracket 107 when the blade carriage assembly 17 comes to rest at second edge 18. When docking bracket 107 is shaped to capture a portion of an upper surface 109 of the bracket 103, the blade carriage assembly 17 is clamped to the surface of the reflective panel and cannot be separated.

In one embodiment, upper roller pairs 118, 120, 122, 124, 126 (shown in FIG. 1) are positioned on blade carriage assembly 17 to travel directly above each elongated support 34*a-f* of the reflector assembly, also referred to as the support frame 32. As shown in FIG. 7, the elongated support 128 of the blade carriage assembly 17 is formed from one inch carbon steel square stock in one example. Roller pairs 116, 118, 120, 122, 124, 126 are positioned over each elongated support member 34*a*, 34*b*, 34*c*, 34*d*, 34*e* and 34*f* in areas of the greatest rigidity of the panels 12, 14.

The flexible blade 130 is fixedly attached to a side of the elongated support 128 by means of double sided adhesive tape. A lower portion of the blade 130 is covered on both sides and on a lower edge with an abrasive fabric material such as a synthetic suede cover 132. A suitable suede fabric can be purchased from Toray International located in Japan by ordering part number Ultra-Suede HP. This cover 132 is secured to the side of the elongated support 128 with double sided tape to the blade 130. The cover 132 could also be secured by sewing with thread or with glue or other suitable adhesive. In other embodiments, the blade 130 is partially positioned in a groove cut into the bottom surface of the elongated member 128 (not shown).

Another important feature of the exemplary cleaning system is illustrated in FIG. 6. A brush 134 is provided in a channel 136 attached fixedly to the moveable support frame 32. The upper edge 138 of the brush 134 comes into contact with the lower edge 139 of the blade 130 just before the blade carriage assembly 17 reaches the stop 106, removing dirt and debris and readying the blade for the next cleaning cycle. In some examples of the invention, the brush 134 is formed from steel wire. In other examples, the brush is formed of synthetic bristles or natural bristles such as horse hair.

Figure 8:
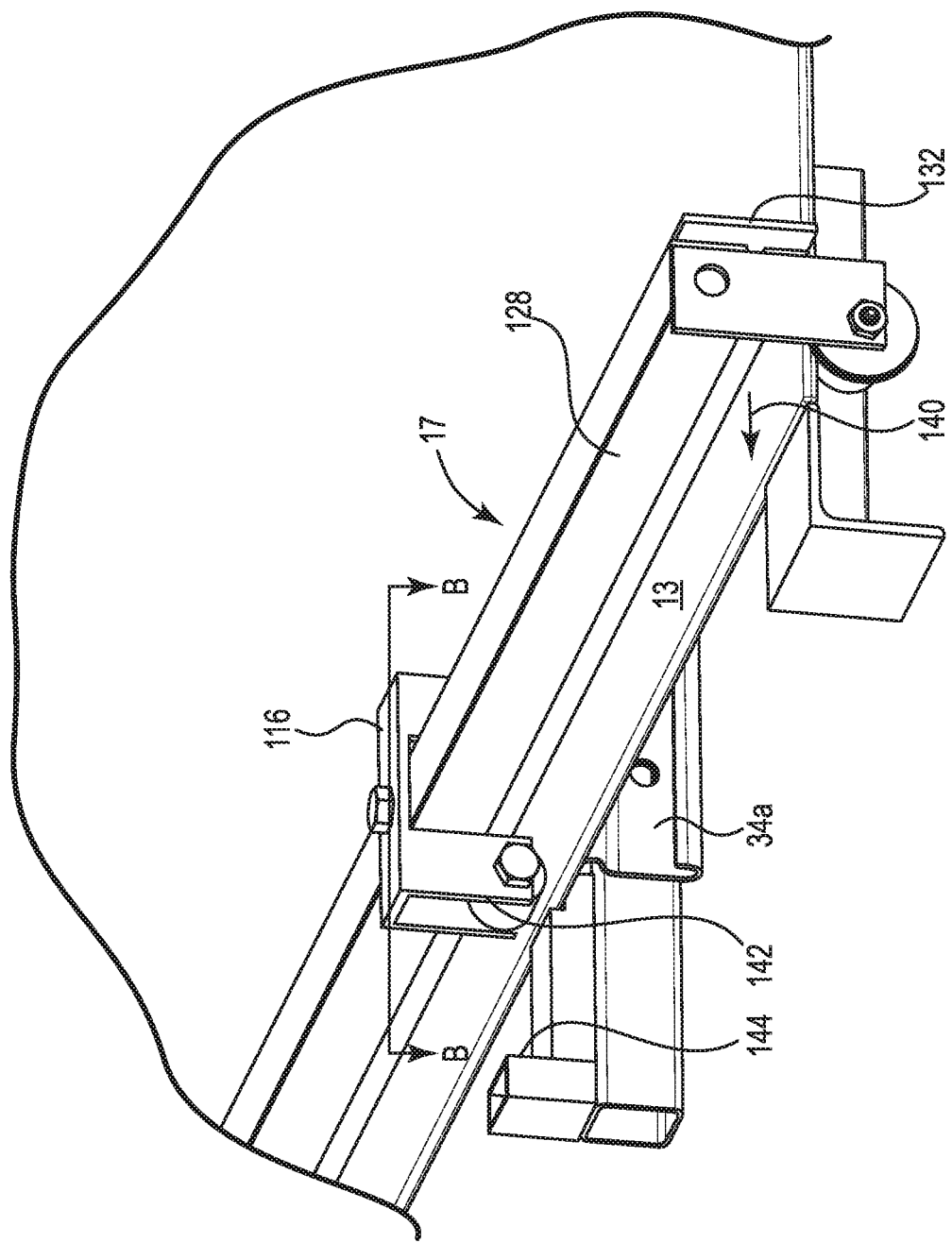
FIG. 8 is an expanded perspective view of the blade carriage assembly, as the carriage assembly is approaching the first docking station.

As shown in more detail in FIG. 8, a perspective view of a portion of the blade carriage assembly 17 is shown with roller pair 116 positioned above elongated support member 34*a*. Elongated support members may be formed of square stock, curved stock or any other stock that provides sufficient stiffness but not allot of weight. Blade carriage assembly 17 moves upwardly over reflective surface 13 in direction 140 until a leading edge 142 of the roller pair 116 comes into contact with stop 144. At this point, the blade carriage assembly 17 is docked in the first docking position.

The operation of the cleaning system will now be described in more detail with reference to the six schematic diagrams included in FIG. 9. The position of angle Ø between the vertical axis 26 of the vertical support 24 and a line co-linear with a side edge 20 of the reflective panel 12, 14 is shown in each of the six positions a, b, c, d, e and f. In position a, the support frame 32 is positioned so that the reflective panels 12, 14 are substantially horizontal. In this position, the carriage assembly 17 is at the first edge 16, docked in the first position. As the control system of the heliostat causes the support frame 32 to rotate in the direction indicated by arrow 150, and when the angle approaches about 50 degrees, the carriage assembly 17 begins to move downwardly across the surface. When the angle is at about 10 degrees, the carriage assembly 17 comes to rest in the second docking station at the second edge 18. When the panels 12, 14 are in a substantially vertical position, as shown in position d, the angle between the vertical and the panel is less than 10 degrees, and in some embodiments zero or slightly less than zero. When the panel is rotated in the direction shown by arrow 152 to an angle of about 60 degrees as shown in position e, the carriage assembly 17 begins to travel upwardly across the reflective surface. The spring force is sufficient to overcome the weight of the carriage assembly 17 and the drag forces between the blade and the reflective surface. When the angle reaches about 85 degrees, the carriage assembly 17 has reached the first edge 16 and the first docking station, completing the second cleaning cycle.

In some embodiments, the blade carriage assembly 17 includes a projection 154 that includes a blade portion that comes into contact and cleans the PV panel 19 of the control system (shown in FIG. 1), assuring that the PV panel is generating full power for the control system.

Although specific angles have been mentioned above, it is to be understood that a range of angles allow adequate operation of the cleaning systems, and the angles may be different depending on the material of construction of the carriage assembly and its weight, on the type of dirt on the reflective surface and how much dirt is on the surface.

Although a torsion spring is one example of a means for providing a counter-force to control the movement of the blade carriage assembly, other devices could be used, such as an air piston, a fluid-filled master cylinder, counterweights and motorized assemblies.

The carriage assembly in one example is built of carbon steel square stock with nylon rollers. In other examples, it is built from stainless steel or other material with sufficient strength and weight characteristics. The number of torsion springs may be increased as the length and weight of the carriage assembly increases. The number of flexible cables and the number of helical spools and pulleys may also vary. Although the structure of the support frame 32 includes elongated supports that are positioned lengthwise between first and second edges 16 and 18, they could be positioned diagonally or in a position where the elongated supports are not parallel to each other. The struts may be of a different construction, such as perforated sheet metal or truss structures.

Only one example of cleaning systems of the present invention has been described in detail. It is to be understood that the disclosed examples are not meant to limit the scope of the present invention, and that the present invention contemplates many other structures, methods and systems which of like purpose and are within the scope of the present invention.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device for cleaning reflective surfaces of a heliostat, the heliostat having a vertical support, at least one reflective panel with a reflective surface, a moveable support frame for supporting the at least one reflective panel and rotating the support frame about a substantially horizontal axis, comprising:
   a blade carriage assembly extending across a width of the reflective surface, the blade carriage assembly comprising an elongated blade that cleans the surface as the blade moves across the reflective surface;
   a guide system capable of controlling the movement of the blade carriage assembly as the moveable support frame pivots about the horizontal axis; and
   a drive system that imparts a torsional spring force on the blade carriage assembly to control movement while the moveable support frame is rotating in a first angular direction and the blade carriage assembly is traveling in a downward direction and to overcome forces in order to move the blade carriage assembly upwardly when the moveable support frame is rotating in a second opposite angular direction.

2. The device of claim 1, wherein the elongated blade is formed of an elastomeric material.

3. The device of claim 2, wherein the elongated blade is at least partially covered with a synthetic suede material.

4. The device of claim 1, wherein the drive system comprises a drive shaft mounted for rotation to the moveable support frame and a spring for applying an angular force to the drive shaft.

5. The device of claim 4, further comprising two spaced apart conical spools for receiving two cables, each cable affixed to the blade carriage assembly in spaced-apart locations.

6. The device of claim 1, wherein the guide system comprises two cables, and two pulleys mounted to the support frame proximate the first edge, wherein each cable travels within a circumferential groove of the pulley, and wherein the pulleys are mounted for rotation about a central axis of each pulley.

7. A device for cleaning reflective surfaces of a heliostat, the heliostat having a vertical support, at least one reflective panel with a reflective surface, a moveable support frame for supporting the at least one reflective panel and rotating the support frame about a substantially horizontal axis, comprising:
   a blade carriage assembly extending across a width of the reflective surface, the blade carriage assembly comprising an elongated blade that cleans the surface as the blade moves across the reflective surface;
   a guide system capable of controlling the movement of the blade carriage assembly as the moveable support frame pivots about the horizontal axis; and
   a drive system that imparts a spring force on the blade carriage assembly to control movement while the moveable support frame is rotating in a first angular direction and the blade carriage assembly is traveling in a downward direction and to overcome forces in order to move the blade carriage assembly upwardly when the moveable support frame is rotating in a second opposite angular direction, wherein a blade cleaning brush is fixedly mounted to the moveable support frame.

8. A device for cleaning reflective surfaces of a heliostat, the heliostat having a vertical support, at least one reflective panel with a reflective surface, a moveable support frame for supporting the at least one reflective panel and rotating the support frame about a substantially horizontal axis, comprising:
- a blade carriage assembly extending across a width of the reflective surface, the blade carriage assembly comprising an elongated blade that cleans the surface as the blade moves across the reflective surface;
- a guide system capable of controlling the movement of the blade carriage assembly as the moveable support frame pivots about the horizontal axis; and
- a drive system that imparts a spring force on the blade carriage assembly to control movement while the moveable support frame is rotating in a first angular direction and the blade carriage assembly is traveling in a downward direction and to overcome forces in order to move the blade carriage assembly upwardly when the moveable support frame is rotating in a second opposite angular direction, wherein the drive system comprises:
  - a drive shaft mounted for rotation to the moveable support frame;
  - a spring for applying an angular force to the drive shaft and
  - two spaced apart conical spools for receiving two cables, each cable affixed to the blade carriage assembly in spaced-apart locations, and each cable affixed to the conical spools on either side of the spring.

9. A device for dry cleaning a substantially flat reflective surface of a reflective panel, the panel having a first edge, a second opposite edge, a first side edge and a second opposite side edge, and a moveable support frame, the support frame including a substantially horizontal support, a horizontal pivotal axis and a drive mechanism for causing the horizontal support to rotate about the pivotal axis in first and opposite rotational directions about the horizontal pivotal axis, the device comprising:
- a blade assembly, comprising an elongated blade support and a flexible blade affixed to the blade support, the flexible blade position-able on the reflective surface and capable of scraping debris off of the reflective surface as the blade assembly moves across the surface;
- a guide system comprising at least one cable, the cable attached at one end to the elongated blade support capable of controlling movement of the blade assembly across the reflective surface, and an opposite end of the cable attached to a drive system; and
- a drive system for permitting the guided blade assembly to move from the first edge to the second opposite edge during rotation of the substantially horizontal support about the horizontal pivotal axis in a first rotational direction by means of gravity, and to move the guided blade from the second edge back to the first edge by means of a torsional spring force when the substantially horizontal support is moving in a second opposite rotational direction.

10. The device of claim 9, wherein the flexible blade is formed from EPDM rubber.

11. The device of claim 9, wherein the elongated blade support comprises a channel, and wherein a portion of the flexible blade is positioned within the channel.

12. The device of claim 9 wherein the drive system comprises a drive shaft with a central axis, wherein the drive shaft is mounted for rotation to the support frame.

13. The device of claim 12, wherein the drive system comprises a spring for applying an angular force to the drive shaft.

14. The device of claim 12, comprising two spaced apart conical spools for receiving two cables, each cable affixed to the blade assembly in spaced-apart locations.

15. The device of claim 9, wherein the drive system comprises at least one conical spool with a helical groove for receiving the cable.

16. A device for dry cleaning a substantially flat reflective surface of a reflective panel, the panel having a first edge, a second opposite edge, a first side edge and a second opposite side edge, and a moveable support frame, the support frame including a substantially horizontal support, a horizontal pivotal axis and a drive mechanism for causing the horizontal support to rotate about the pivotal axis in first and opposite rotational directions about the horizontal pivotal axis, the device comprising:
- a blade assembly, comprising an elongated blade support and a flexible blade affixed to the blade support, the flexible blade position-able on the reflective surface and capable of scraping debris off of the reflective surface as the blade assembly moves across the surface;
- a guide system comprising at least one cable, the cable attached at one end to the elongated blade support capable of controlling movement of the blade assembly across the reflective surface, and an opposite end of the cable attached to a drive system; and
- a drive system for permitting the guided blade assembly to move from the first edge to the second opposite edge during rotation of the substantially horizontal support about the horizontal pivotal axis in a first rotational direction by means of gravity, and to move the guided blade from the second edge back to the first edge by means of a spring force when the substantially horizontal support is moving in a second opposite rotational direction, the drive system comprising:
  - a drive shaft with a central axis, wherein the drive shaft is mounted for rotation to the support frame;
  - a spring for applying an angular force to the drive shaft; and
  - two spaced apart conical spools for receiving two cables, each cable affixed to the conical spools on either side of the spring.

* * * * *